(12) United States Patent
Sato et al.

(10) Patent No.: US 9,280,150 B2
(45) Date of Patent: Mar. 8, 2016

(54) NUMERICAL CONTROLLER

(75) Inventors: Tomonori Sato, Tokyo (JP); Naoki Nakamura, Tokyo (JP); Takeshi Tsuda, Tokyo (JP); Shunro Ono, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 959 days.

(21) Appl. No.: 13/511,848

(22) PCT Filed: Nov. 26, 2009

(86) PCT No.: PCT/JP2009/006370
§ 371 (c)(1),
(2), (4) Date: May 24, 2012

(87) PCT Pub. No.: WO2011/064816
PCT Pub. Date: Jun. 3, 2011

(65) Prior Publication Data
US 2012/0271446 A1 Oct. 25, 2012

(51) Int. Cl.
*G05B 19/19* (2006.01)
*G05B 19/416* (2006.01)

(52) U.S. Cl.
CPC .. *G05B 19/4166* (2013.01); *G05B 2219/43156* (2013.01)

(58) Field of Classification Search
CPC .............. G05B 2219/43156; G05B 19/4166
See application file for complete search history.

(56) References Cited

U.S. PATENT DOCUMENTS

| | | | | |
|---|---|---|---|---|
| 4,163,313 | A * | 8/1979 | Matsuno et al. | 29/563 |
| 4,253,359 | A * | 3/1981 | Youden | 82/134 |
| 4,267,495 | A * | 5/1981 | Wilterdink | 318/571 |
| 5,537,565 | A * | 7/1996 | Hyatt | 711/105 |
| 5,888,037 | A * | 3/1999 | Fujimoto et al. | 409/79 |
| 6,075,335 | A * | 6/2000 | Momochi et al. | 318/571 |
| 6,671,573 | B2 * | 12/2003 | Nigazawa et al. | 700/193 |

(Continued)

FOREIGN PATENT DOCUMENTS

| | | |
|---|---|---|
| JP | 08-202425 A | 8/1996 |
| JP | 2002-366208 A | 12/2002 |

(Continued)

OTHER PUBLICATIONS

Office Action dated Jun. 26, 2013; issued by the German Patent and trademark Office in counterpart application No. 112009005397.1.

(Continued)

*Primary Examiner* — Ramesh Patel
(74) *Attorney, Agent, or Firm* — Sughrue Mion, PLLC; Richard C. Turner

(57) ABSTRACT

A numerical controller obtains a position of each driving shaft of a machine performing determination of a feeding speed, interpolation and coordinate conversion according to a relative instruction path and an instruction speed of a tool tip point relative to a work instructed to a processing program. When determining the feeding speed, a reference point is provided on a tool or a table, a translation speed of the reference point viewed from a mechanical coordinate system is set to an observation target speed, a reference feeding speed is obtained so that the observation target speed is a predetermined reference speed, and the smaller of the reference feeding speed and the instruction feeding speed is set to the feeding speed.

2 Claims, 7 Drawing Sheets

(56) References Cited

U.S. PATENT DOCUMENTS

| | | | |
|---|---|---|---|
| 7,047,107 B2* | 5/2006 | Minoshima et al. | 700/245 |
| 7,239,938 B2* | 7/2007 | Otsuki et al. | 700/178 |
| 7,391,178 B2* | 6/2008 | Tanaka et al. | 318/568.2 |
| 2004/0054437 A1* | 3/2004 | Kimura et al. | 700/245 |
| 2013/0269735 A1* | 10/2013 | Roetzel et al. | 134/40 |
| 2014/0172153 A1* | 6/2014 | Nishibashi | 700/192 |

FOREIGN PATENT DOCUMENTS

| | | |
|---|---|---|
| JP | 2004-185364 A | 7/2004 |
| JP | 2004-220435 A | 8/2004 |
| JP | 2009-015464 A | 1/2009 |
| WO | 02/066210 A1 | 8/2002 |

OTHER PUBLICATIONS

International Search Report for PCT/JP2009/006370 dated Mar. 2, 2010 [PCT/ISA/210].

Written Opinion for PCT/JP2009/006370 dated Mar. 2, 2010 [PCT/ISA/237].

* cited by examiner

```
TIP POINT CONTROL ON
N1 G54G90G1F1000
N2 G43. 4 H1
N3 X0. Y0. Z0. B5. C0.
N4 Y0. 5 B0. C10
```

(1) PROCESSING PROGRAM (3) MOVEMENT OF TOOL AND WORK VIEWED FROM MECHANICAL COORDINATE SYSTEM (XY PLANE)

(2) TOOL MOVEMENT VIEWED FROM WORK COORDINATE SYSTEM (4) MOVEMENT OF TOOL AND WORK VIEWED FROM MECHANICAL COORDINATE SYSTEM (XZ PLANE)

NUMERICAL CONTROLLER

TECHNICAL FIELD

The present invention relates to a numerical controller of a machine tool. Particularly, the present invention relates to a numerical controller of a multi-axis machine tool capable of controlling a relative position and a posture of a tool relative to a work provided with a rotation driving shaft, typically, a five-axis processing machine.

BACKGROUND ART

Generally, in a numerical controller of a machine tool, by performing the relative movement of the tool relative to the work, by operating either or both of a translation driving shaft (a straight line driving shaft such as the X axis, the Y axis and the Z axis) and a rotation driving shaft (a tool rotation driving shaft or a table rotation driving shaft such as an A axis, B axis and a C axis) included in the machine tool according to a processing program, the control is performed so as to process a predetermined processing shape. At this time, the processing program includes a case of directly instructing the movement of each driving shaft, and a case of instructing the relative movement of the tool relative to the work to convert the relative movement into the movement of each driving shaft in the numerical controller.

In the controlling of a machine, which includes a rotation driving shaft also capable of changing a posture of the tool with respect to the work, like the five-axis processing machine, in a case of using the latter method mentioned above, that is, the method of instructing the relative movement of the tool relative to the work to the processing program to convert the relative movement into the movement of each driving shaft in the numerical controller, there is a problem as below.

In addition, herein, the expression instructing the relative movement of the tool relative to the work to the processing program refers to a case of moving a tool tip point actually performing the processing with respect to the work, and instructing the relative position and the posture of the tool tip point relative to the work and a relative feeding speed of the tool tip point relative to the work to the processing program (generally, referred to as tool tip point control).

That is, for example, in the case of performing the movement instruction which performs a great tool posture change when the movement of the position of the tool tip point is small in the processing program, if the feeding speed of the tool tip point is constantly maintained with respect to the work, the great tool posture change is generated in a short time, whereby the speed of the rotation driving shaft is rapidly increased, and in addition, the speed of the translation driving shaft is also rapidly increased. Otherwise, as another example, even if the tool posture change to be instructed to the processing program is small, in a case where the tool posture approaches a peculiar point in the five-axis processing machine, the great tool posture change is generated, and similarly, the speeds of the rotation driving shaft and the translation driving shaft are rapidly increased. In this manner, when the speed of each driving shaft is rapidly changed, there is a risk such as mechanical collision and contact with an operator, and there is a problem in that mechanical vibrations and excessive energy consumption are caused.

The peculiar point generally refers to a state where a function of a degree of freedom of a specific direction is lost, and in the case of a machine tool including a rotation shaft, the peculiar point refers to a position (an angle) in which the tool posture relative to the work is not changed even if any rotation driving shaft is moved.

For this reason, there is a technique which controls the feeding speed so as to be automatically lowered in an inner portion of a numerical controller so as not to exceed the maximum speed allowed (generally, referred to as a rapid-feeding speed or a cutting clamp speed) (see Patent Citation 1).

Moreover, separate from the relative feeding speed of the tool tip point relative to the work, there is a technique which instructs the tool posture speed (see Patent Citation 2).

PRIOR ART REFERENCE

Patent References

[Patent Citation 1] JP-A-2002-366208
[Patent Citation 2] JP-A-2004-185364

DISCLOSURE OF INVENTION

Technical Problem

However, in the method disclosed in Patent Citation 1, the respective driving shafts of the machine are driven up to a speed of a considerably high speed such as the rapid-feeding speed or the cutting clamp speed, which is insufficient. At this time, if the rapid-feeding speed or the cutting clamp speed is sufficiently lowered, the speeds of each driving shaft of the machine are of course lowered to a sufficiently low speed. However, in that case, even in processing (for example, processing for translation three-shafts only) which does not involve the tool posture change, the speed is limited, the processing efficiency falls drastically, and after all, it is insufficient.

Furthermore, in a method disclosed in Patent Citation 2, the speed of the rotation driving shaft for changing the tool posture can be limited. However, in a case where a length from the tool tip to a rotation center of a tool side rotation driving shaft is long, and in a case where a length from a rotation center of a work side rotation driving shaft to the work is long, the translation speed of the machine is determined by a product of the distance and the speed of the rotation driving shaft. Thus, there are cases where the translation speeds of each driving shaft of the machine are considerably high and, on the contrary, cases where the speeds unnecessarily become the low speed.

Furthermore, the method disclosed in Patent Citation 2 is also practically troublesome from the viewpoint that a programmer needs to separately instruct the speed of the rotation driving shaft to the processing program.

Furthermore, in a case where the movement of each driving shaft is directly instructed to the processing program without instructing the relative movement of the tool relative to the work to the processing program, in some cases, the amount of translation movement of the tool relative to the work becomes 0 or becomes small. In that case, there is also a problem in that the feeding speed of the tool relative to the work becomes 0 or the low speed, and the processing time is unnecessarily long.

The present invention has been made so as to solve the problems mentioned above, and an object thereof is to provide a numerical controller that is able to suppress a risk such as a mechanical collision and a contact with an operator by suppressing the rapid change of the translation speed as well as the speed of the rotation driving shaft accompanied by the great tool posture change, and is able to prevent mechanical vibrations and excessive energy consumption from occurring.

Furthermore, another object of the present invention is to provide a numerical controller which is able to reduce processing time by controlling the amount of translation movement of the tool relative to the work to be high, in a case where it is low.

Means for Solving the Problem

The present invention solves the above-described problem, and in order to accomplish the object, there is provided a numerical controller that controls a relative position and a posture of a tool relative to a work of a multi-axes machine tool, which includes a translation driving shaft performing a translation movement of the tool relative to the work, a work side rotation driving shaft rotating and moving a table with the work placed thereon, and a tool side rotation driving shaft rotating and moving the tool, based on a relative instruction path and a feeding speed of a tool tip point relative to the work, the numerical controller comprising: a feeding speed determination portion which outputs a relative feeding speed of the tool tip point relative to the work; an interpolation portion which obtains a position of the tool tip point relative to the work and an interpolation position of the tool posture for each control cycle that is moved along the instruction path at the feeding speed; and a coordinate conversion portion which performs a coordinate conversion from the interpolation position to the position of the driving shaft, by the use of a relational expression of the position of the driving shaft relative to the interpolation position, wherein the feeding speed determination portion obtains a highest feeding speed along the instruction path in which each driving shaft does not exceed the highest speed, obtains a reference feeding speed so that the translation speed of the tool tip point viewed from the mechanical coordinate system is set to an observation target speed and the observation target speed is a predetermined reference speed, and among an instruction feeding speed to be instructed by a processing program or the like and the obtained highest feeding speed and the obtained reference feeding speed, outputs the smallest feeding speed to the interpolation portion.

Further, the present invention provides a numerical controller that controls a relative position and a posture of a tool relative to a work of a multi-axes machine tool, which includes a translation driving shaft of one axis or more performing a relative translation movement of the tool relative to the work, and a rotation driving shaft of one axis or more including a tool side rotation driving shaft rotating and moving the tool, based on a relative instruction path and an instruction feeding speed of a tool tip point relative to the work, the numerical controller comprising: a feeding speed determination portion which outputs a relative feeding speed of the tool tip point relative to the work; an interpolation portion which obtains a position of the tool tip point relative to the work and an interpolation position of the tool posture for each control cycle that is moved along the instruction path at the feeding speed; and a coordinate conversion portion which performs a coordinate conversion from the interpolation position to the position of the driving shaft, by the use of a relational expression of the position of the driving shaft relative to the interpolation position, wherein the feeding speed determination portion obtains a highest feeding speed along the instruction path in which each driving shaft does not exceed the highest speed, defines a reference point on a movable portion to be driven by the tool side rotation driving shaft, obtains a reference feeding speed so that the translation speed of the reference point viewed from the mechanical coordinate system is set to an observation target speed and the observation target speed is a predetermined reference speed, and among an instruction feeding speed to be instructed by a processing program or the like, the obtained highest feeding speed and the obtained reference feeding speed, outputs the smallest feeding speed to the interpolation portion.

Further, in the present invention, the reference point is set to a part of a rotation center axis of the tool or a part of an opposite side of the tool from the rotation center axis of the tool.

Further, the present invention provides a numerical controller that controls a relative translation position and a posture of a tool relative to a work of a multi-axes machine tool, which includes a translation driving shaft of one axis or more performing a relative translation movement of the tool relative to the work, and a rotation driving shaft of one axis or more including a work side rotation driving shaft rotating and moving a table with the work placed thereon, based on a relative instruction path and an instruction feeding speed of a tool tip point relative to the work, the numerical controller comprising: a feeding speed determination portion which outputs a relative feeding speed of the tool tip point relative to the work; an interpolation portion which obtains a position of the tool tip point relative to the work and an interpolation position of the tool posture for each control cycle that is moved along the instruction path at the feeding speed; and a coordinate conversion portion which performs a coordinate conversion from the interpolation position to the position of the driving shaft, by the use of a relational expression of the position of the driving shaft relative to the interpolation position, wherein the feeding speed determination portion obtains a highest feeding speed along the instruction path in which each driving shaft does not exceed the highest speed, defines a reference point on a movable portion, a jig or the work to be driven by the work side rotation driving shaft, obtains a reference feeding speed so that the translation speed of the reference point viewed from the mechanical coordinate system is set to an observation target speed and the observation target speed is a predetermined reference speed, and among an instruction feeding speed to be instructed by a processing program or the like, the obtained highest feeding speed and the obtained reference feeding speed, outputs the smallest feeding speed to the interpolation portion.

Further, in the present invention, the reference speed is obtained by multiplying the observation target speed in a preceding movement or a succeeding movement or the instruction feeding speed by a constant of 1 or more, or by adding a positive constant thereto.

Further, the present invention provides a numerical controller that controls a relative position and a tool posture of a tool relative to a work of a multi-axes machine tool, which includes a translation movement shaft performing a translation movement of the tool relative to the work, and a rotation driving shaft rotating and moving a table with the work placed thereon, based on an instruction path of each driving shaft and an instruction feeding speed of entire driving shaft combination, the numerical controller comprising: a feeding speed determination portion which outputs a feeding speed; and an interpolation portion which obtains an interpolation position of each driving shaft for each control cycle that is moved along the instruction path at the feeding speed, wherein, when an amount of translation movement of the tool relative to the work is 0 or small, the feeding speed determination portion obtains a highest feeding speed along the instruction path in which each driving shaft does not exceed the highest speed, without outputting the instruction feeding speed to be instructed by a processing program or the like to the interpolation portion, obtains a reference feeding speed of the entire driving shaft combination so that the translation speed of the tool tip point relative to the work is set to an observation target speed and the observation target speed is a predetermined reference speed, and among the obtained highest feeding speed and the obtained reference feeding speed, outputs a smaller feeding speed to the interpolation portion.

Further, in the present invention, the interpolation portion performs the interpolation so that the instruction path is moved in a movement time 0 or a minimum control cycle, when the tool posture relative to the work is a peculiar posture in the instruction path instructed to the processing program, and there is no translation movement of the tool tip point relative to the work.

Advantageous Effects

According to the present invention, in a machine tool (typically, a mixed type five-axis processing machine) which includes a translation driving shaft and a rotation driving shaft on a work side and a tool side, by limiting the translation speed of a tool tip point viewed from a mechanical coordinate system to be equal to or less than a predetermined reference speed, a risk such as a mechanical collision and the contact with an operator can be reduced, it is possible to prevent the mechanical vibration and the excessive energy consumption being generated, and the processing efficiency does not decline.

Furthermore, according to the present invention, in the machine tool (typically, a mixed type or a tool tilt type five-axis processing machine) which includes the translation driving shaft and the tool side rotation driving shaft, by limiting the translation speed of a reference point on a movable portion to be driven by the tool side rotation driving shaft viewed from the mechanical coordinate system to be equal to or less than a predetermined reference speed, a risk such as a mechanical collision and the contact with an operator can be reduced, it is possible to prevent that the mechanical vibration and the excessive energy consumption are generated, and the processing efficiency does not decline.

Furthermore, according to the present invention, in the invention, by setting the reference point in the rotation center axis of the tool or in a part of an opposite side of the tool from the rotation center axis of the tool, it is possible to further suppress the risk such as the mechanical collision and the contact with the operator.

According to the present invention, in the machine tool (typically, a mixed type or a table tilt type five-axis processing machine) which includes the translation driving shaft and the work side rotation driving shaft, by limiting the translation speed of the reference point on a movable portion to be driven by the work side rotation driving shaft, a jig or the work viewed from the mechanical coordinate system to be equal to or less than a predetermined reference speed, the risk such as the mechanical collision and the contact with the operator can be reduced, it is possible to prevent that the mechanical vibration and the excessive energy consumption are generated, and the processing efficiency does not decline.

Furthermore, according to the present invention, in the respective inventions, by automatically obtaining the reference speed from an observation target speed or an instruction feeding speed in a preceding or succeeding movement, it is possible to omit a labor of instruct man power of a processing program creator.

According to the present invention, in the machine tool (typically, a five-axis processing machine) which includes the translation driving shaft and the rotation driving shaft, in a case where the amount of translation movement of the tool relative to the work is 0 or small, it is possible to maintain the translation velocity of the tool tip point relative to the work at a predetermined speed to avoid the feeding speed being unnecessarily lowered, and excessive feeding speed can be prevented.

Furthermore, according to the present invention, in the invention, in a case where the tool posture relative to the work is a peculiar posture and there is no translation movement of the tool tip point relative to the work, an instruction path thereof is moved in a movement time 0 or a minimum control period, whereby it is possible to reduce the processing time.

BEST MODE FOR CARRYING OUT THE INVENTION

Embodiment 1

Hereinafter, embodiment 1 of the present invention will be described using FIGS. 1 to 5.

Figure 1:
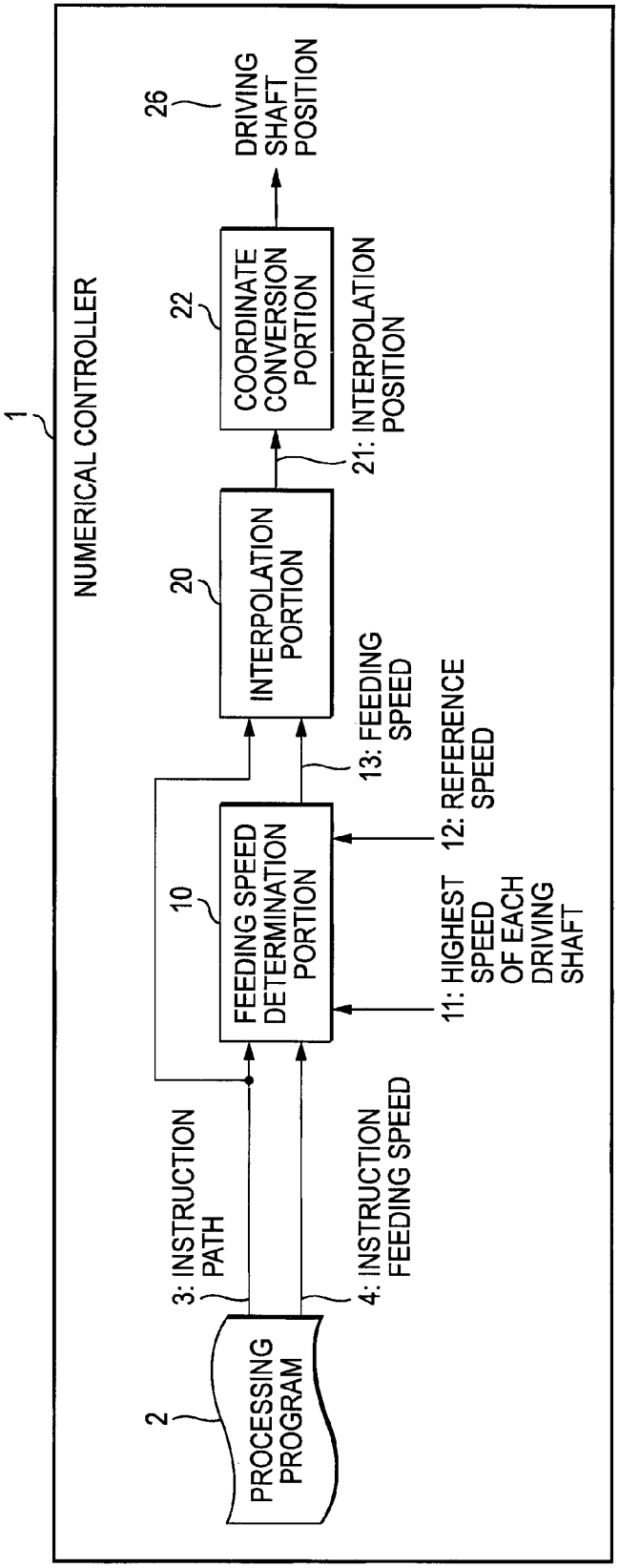
FIG. 1 is a block diagram that shows a configuration of a numerical controller according to embodiment 1 of the present invention.

FIG. 1 is a block diagram that shows a configuration of a numerical controller according to the embodiment 1 of the present invention. In FIG. 1, reference numeral 1 is a numerical controller, reference numeral 2 is a processing program, reference numeral 3 is an instruction path, reference numeral 4 is an instruction feeding speed, reference numeral 10 is a feeding speed detection portion, reference numeral 11 is a maximum speed of each driving shaft, reference numeral 12 is a reference speed, reference numeral 13 is a feeding speed, reference numeral 20 is an interpolation portion, reference numeral 21 is an interpolation position, reference numeral 22 is a coordinate conversion portion, and reference numeral 23 is a driving shaft position.

An order (instruction), which shows the instruction path 3 and the instruction feeding speed 4 by a CAM or a manual editing, is instructed to the processing program 2 according to a predetermined program format. Herein, the instruction path 3 is a relative instruction path of the tool tip point relative to the work, and the instruction feeding speed 4 is a relative instruction feeding speed of the tool tip point relative to the work. The instruction path 3 includes the translation position and the tool posture.

Furthermore, herein, the respective driving shafts refer to the translation driving shaft and the rotation driving shaft included in the machine tool, and refer to, for example, total five-axes of the translation driving shaft, 3 straight line axes (an X axis, a Y axis and a Z axis) and 2 rotational axes (two of an A axis, a B axis and a C axis) in the five-axis processing machine. The highest speed 11 of each driving shaft is preset from transmission characteristics of an actuator and a ball screw which drive the respective driving shafts, a mass (or inertia) of the machine to be driven or the like, and refers to an allowed maximum speed of the respective driving shafts. Furthermore, the reference speed is set by a parameter or the like from the viewpoint of the prevention of the mechanical collision or the like in advance, is input by an operator from an operation panel and a screen, or is automatically calculated from the instruction feeding speed and the preceding and succeeding movement as described later.

Figure 2:
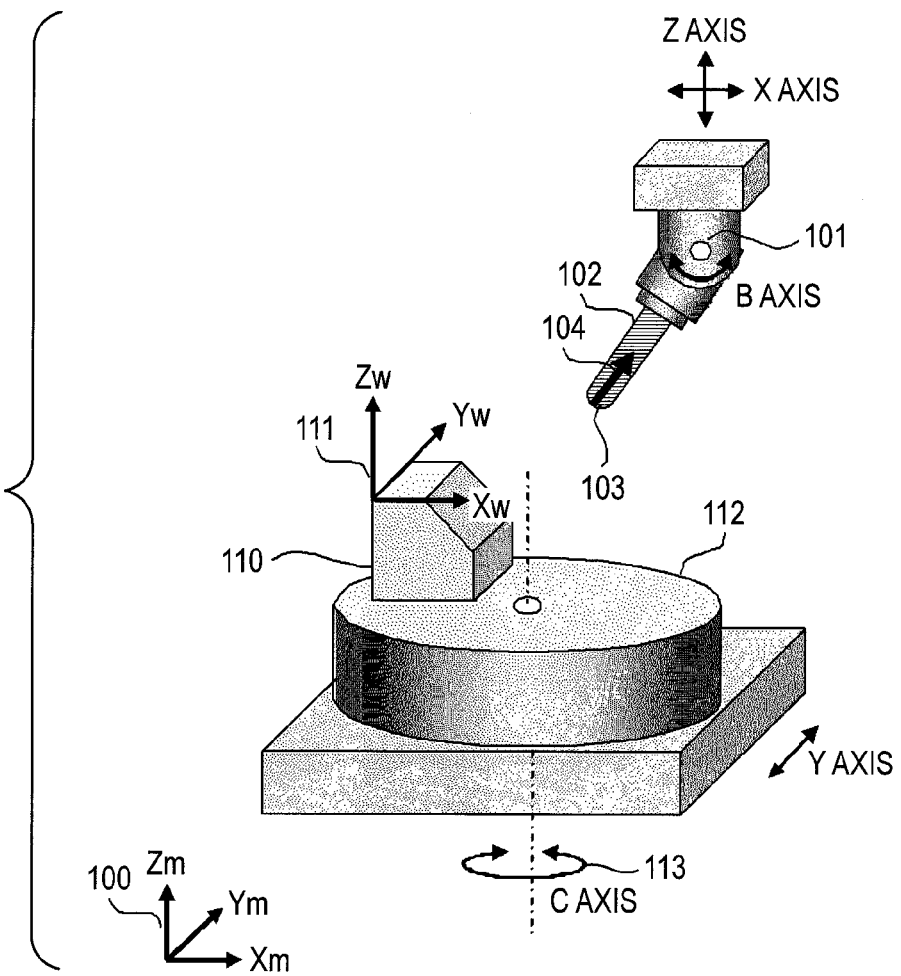
FIG. 2 is a schematic diagram that shows a mechanical configuration of a machine tool in the embodiment 1 of the present invention.

FIG. 2 is a schematic diagram that shows a mechanical configuration of the machine tool in the embodiment 1 of the present invention. In FIG. 2, reference numeral 100 is a mechanical coordinate system, and is a coordinate system which is constituted by orthogonal 3 axes of XM, YM and ZM, and is mechanically fixed. Reference numeral 101 is a tool side rotation driving shaft (in the present example, the B axis rotated around the Y axis), reference numeral 102 is a tool, a reference numeral 103 is a tool tip point (a tool tip center point), and reference numeral 104 is a tool shaft direction vector (a tool posture vector). The tool shaft direction vector is a unit vector which faces from the tool tip point to a root side of the tool (a main shaft end surface direction). The tool 102 performs the processing by being rotated around the tool shaft direction vector by a main shaft (not shown). Reference numeral 110 is a work (a work piece), a reference numeral 111 is a work coordinate system, reference numeral 112 is a table (in the present example, a circular table) for moving the work, and reference numeral 113 is a work side rotation driving shaft (in the present example, the C axis rotated around the Z axis) for rotating the table. The work coordinate system is constituted by the orthogonal 3 axes XW, YW and ZW, is set in a predetermined direction based on the reference position of the work (in the present example, one angle on the work upper surface), and is fixed onto the work. When the table 112 is rotated, the work 110 is rotated, but, at this time, the work coordinate system 111 is moved in connection with the table. That is, the work coordinate system mentioned herein is a coordinate system that is fixed onto the work which is moved in connection with the table. Meanwhile, the mechanical coordinate system is not moved in connection with the table. The shaft configuration of the machine is a so-called mixed type five-axis processing machine which includes the rotation driving shaft on the work side (the table side) and the tool side (the main shaft side) one by one, respectively, in addition to the translation three axes.

Figure 3:
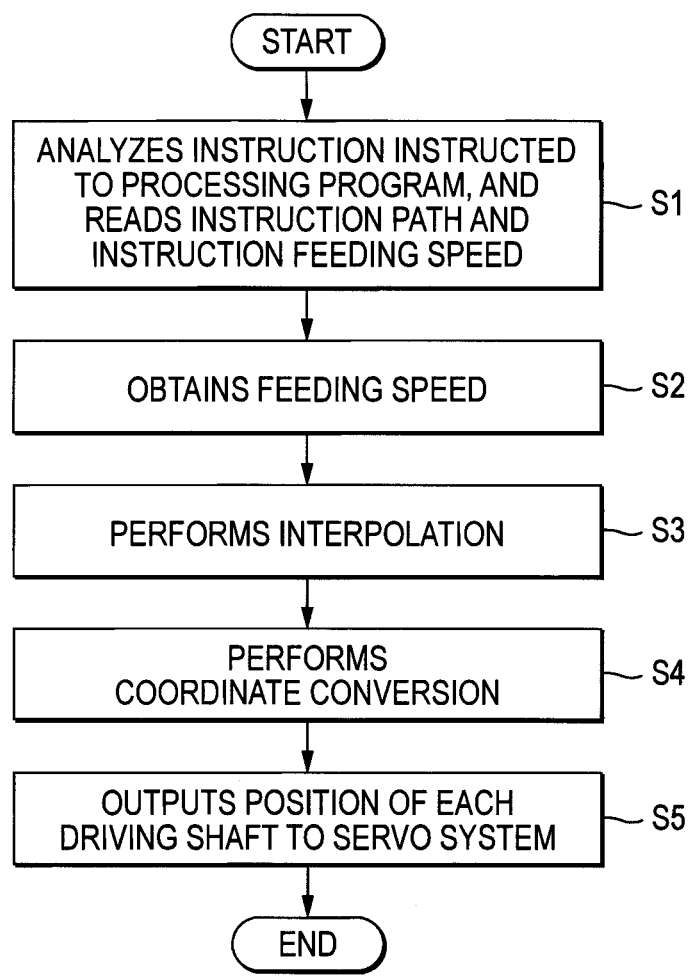
FIG. 3 is a flowchart that shows a flow of the processing in the numerical controller according to the embodiment 1 of the present invention.

Next, an operation will be described. FIG. 3 is a flowchart that shows a flow of the processing in the numerical controller according to the embodiment 1 of the present invention.

In step S1, the instruction instructed to the processing program 2 is analyzed and the instruction path 3 and the instruction feeding speed 4 are read. Herein, the instruction path 3 is a relative instruction path of the tool tip point relative to the work, and the instruction feeding speed 4 is a relative instruction feeding speed of the tool tip point relative to the work. That is, the instruction path and the instruction speed are those of the tool tip point 103 viewed from the work coordinate system 11 connected with the table 112 in FIG. 2.

Next, in step S2, in the feeding speed determination portion 10 of FIG. 1, the feeding speed 13 is obtained from the instruction path 3 and the instruction feeding speed 4 instructed to the processing program, the highest speed 11 of each driving shaft, and the reference speed 12. An operation of step S2 is a center portion of the present invention, and the details thereof will be described below using FIG. 4.

In step S3, in the interpolation portion 20 of FIG. 1, a position (a translation position) of the tool tip point relative to the work for each control cycle (an interpolation cycle) moved at the feeding speed 13 along the instruction path 3, and the interpolation position 21 of the tool posture are obtained. When expressing the feeding speed as F, the control cycle as dT, the instruction path as a function C(s), and as a parameter of a curve, if a parameter corresponding to the current interpolation position is set to s1, the parameter 2 is obtained in an analytic manner or a numerical manner so that a length along the curve from the current interpolation position C(s1) to the next interpolation position C(s) coincides with an interpolation length (that is, a product of the feeding speed F and the control cycle dT) for each control cycle, and the position C(s) on the curve corresponding to the parameter s is set to the next interpolation position. In addition, in the tool tip point control, the instruction feeding speed is a synthetic translation speed of the tool tip point relative to the work, and the tool posture change is interpolated in synchronous with the tool tip point. In the function C(s) indicating the instruction path, when a translation movement component is Ct(s) and a tool posture change (a rotation movement) component is Cr(s), the parameter s is obtained in an analytic manner or a numerical manner so that a distance along a curve from the current interpolation position Ct(s1) to the next interpolation position Ct(s) in regard to the translation movement coincides with the interpolation length (that is, the product of the feeding speed F and the control cycle dT) for each control cycle, the position Ct(s) on the curve regarding the translation movement corresponding to the parameter s is set to the interpolation position of the next translation position, and the position Cr(s) on the curve indicating the tool posture change corresponding to the parameter s is set to the interpolation position of the tool posture.

In step S4, in the coordinate conversion portion 22 of FIG. 1, the coordinate conversion is performed from the interpolation position 21 to the driving shaft position 23 by the use of the relational expression of the driving shaft position 23 relative to the interpolation position 21. It is generally known that the relationship of the coordinate conversion can be mathematically expressed from inverse kinematics based on a direction of the rotation driving shaft of each driving shaft, a ring length between each driving shaft or the like. Herein, for the purpose of the description below, when a position of each translation driving shaft is Pm (a vector of three elements of Xm, Ym and Zm in the example of FIG. 2), each rotation driving shaft is θ (θ is a vector of two elements including B and C in the example of FIG. 2), a tool tip position viewed from the work coordinate system is Pw (Pw is a vector of three elements including Xw, Yw and Zw), and a tool posture vector viewed from the work coordinate system is Qw (a unit vector of three elements), the relationship is established as below.

$$Pw = \phi(Pm, \theta) \quad \text{(formula 1)}$$

$$Qw = \psi(\theta) \quad \text{(formula 2)}$$

$$Pm = \phi^{-1}(Pw, \theta) \quad \text{(formula 3)}$$

$$\theta = \psi^{-1}(Qw) \quad \text{(formula 4)}$$

In step S5, the driving shaft position 23 is sent to a servo system (an amp) as a position instruction of each driving shaft, and the machine tool is operated by driving the position of each driving shaft of the machine tool.

Actually, in the process of a series of flows, the acceleration processing for smoothening the synthetic speed acceleration before interpolation is performed for each shaft (an acceleration after the interpolation). However, since a description concerning which portion and with respect to which data acceleration processing is performed has no connection with the present invention, the description thereof will be omitted.

Next, a detailed operation of the processing (the processing of obtaining the feeding speed) of step S2 in FIG. 3 will be described using a flowchart of FIG. 4.

In step S21, a highest feeding speed FMX along the instruction path is obtained in which any driving shaft does not exceed the highest speed. The feeding speed is obtained using the position viewed from the work coordinate system and the relational expression of the coordinate conversion between the tool posture and the position of each driving shaft so that the speed of any driving shaft does not exceed the highest speed 11 of each driving shaft. The position of the current translation driving shaft, the position of each rotation driving shaft, the tool tip position viewed from the work coordinate system, and the tool posture vector viewed from the work coordinate system are set to Pm, θ, Pw, and Qw, respectively. Positions Pw' and Ww' on the work coordinate system moved from the current position along the instruction path at a unit speed are obtained in the same manner as the interpolation processing of step S3 of FIG. 3. The position Pm' of the translation driving shaft after movement and the position θ' of each rotation driving shaft are obtained using the relational expression of the coordinate conversion ($\phi^{-1}$, $\psi^{-1}$). The highest speed of each driving shaft is divided by an absolute value (a distance) of a difference between the position of each driving shaft after movement and the current position of each driving shaft, the calculation is performed for each shaft, and a minimum value of them is set to F. The highest feeding speed FMX along the instruction path is obtained in which F does not exceed the highest speed in all driving shafts.

In step S22, a reference feeding speed FMB along the instruction path is obtained in which the observation target speed FCHK is the reference speed BAS. The reference point pc is set to the translation position of the tool tip point 103 viewed from the mechanical coordinate system 100, and the observation target speed FCHK is set to the translation speed of the reference point pc. When L is set to a length parallel to the tool axial direction vector from the tool tip point to the rotation driving shaft center, the relationship is established as below.

$$pc=\Gamma(Pm,\theta)=(Xm-L \sin B, \text{const.}, Zm-L \cos B) \quad \text{(formula 5)}$$

A symbol const. indicates a constant. A symbol Γ is a function which indicates the translation position of the reference point viewed from the mechanical coordinate system relative to the position of each driving shaft. In this case, the X axis, the Z axis and the B axis moving the tool are related, but the Y axis and the C axis of the work side are not related. When the tool tip point is moved along the instruction path at the feeding speed F, the positions Pw' and Qw' on the work coordinate system of a case of being moved from the current position along the instruction path at the unit speed are obtained in the same manner as the interpolation processing of step S3 of FIG. 3.

Next, A position Pm' of the translation driving shaft after movement and a position θ' of each rotation driving shaft are obtained using the relational expression ($\phi^{-1}$, $\psi^{-1}$) of the coordinate conversion. A position pc' after movement of the reference point is obtained using Pm', θ' and the function Γ. A value, which divides the reference speed BAS by the division of an absolute value (a distance) of a difference between the position pc' of the reference point after movement and the position pc of the current reference point by the control cycle, is the reference feeding speed FMB (FMB=BAS/(|pc'-pc|/dT)). The observation target speed FCHK is the same as the instruction feeding speed FCMD in the meaning of the translation speed of the tool tip point. However, the instruction feeding speed FCMD is the translation speed viewed from the work coordinate system 111, and meanwhile the observation target speed FCHK is the speed viewed from the mechanical coordinate system 100, and both values differ from each other in the instruction path in which the table side rotation driving shaft is also moved.

In step S23, the minimum speed of the instruction feeding speed FCMD, the highest feeding speed FMX, and the reference feeding speed FMB is set to F, and is finally set to the feeding speed 13 which is output to the interpolation portion 20.

In addition, in step S21 and step S22, the position may be subjected to the coordinate conversion using the functions $\phi$, $\psi$ or Γ to obtain the speed from the difference of the position, or the speed generated in each driving shaft or the reference point may be directly obtained using a Jacoby function of the functions of $\phi$, $\psi$ and Γ.

Figure 5:
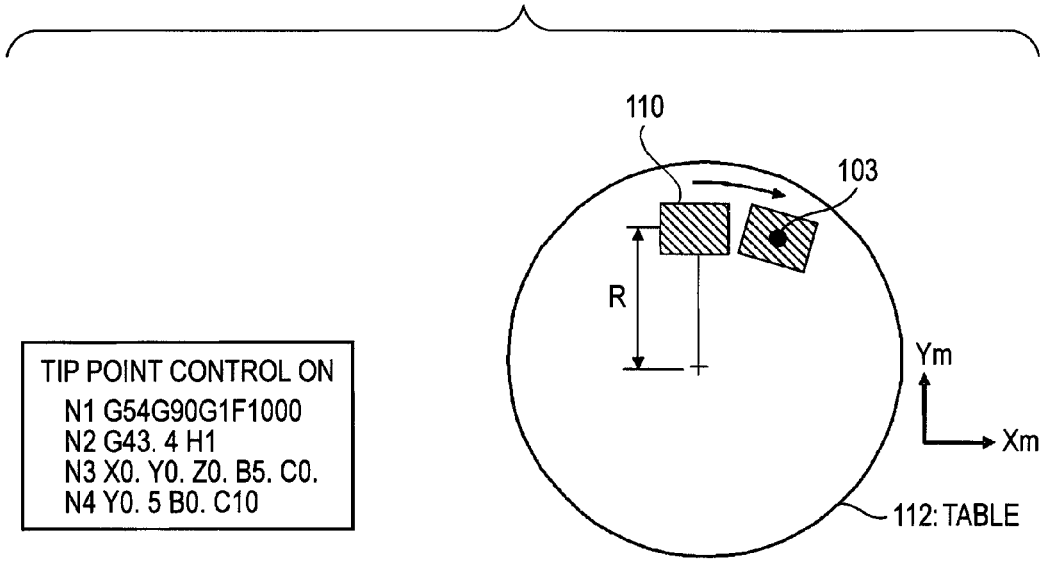
FIG. 5 is a diagram that shows a movement of a machine in the embodiment 1 of the present invention.
Figure 5:
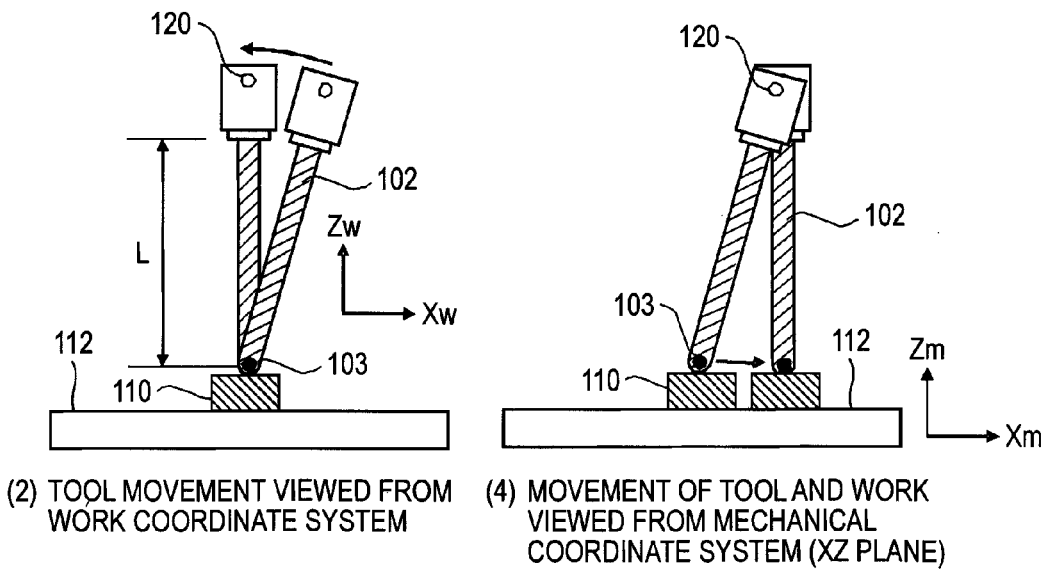

Next, FIG. 5 shows a movement example of the machine of the case of using the present invention.

FIG. 5(1) is a processing program, the tool tip point control mode is effective in an N2 block. In an N3 block, the X, Y and Z axes are moved by 0° (a work original point), the B axis is moved by 5°, and the C axis is moved by 0°. In an N4 block, the tool tip point is nearly moved (exactly, moved by a minute amount such as 0.5 in the Y axis direction), and the programming is set such that mainly the angle of the B axis is moved by 0° and the angle of the C axis is moved by 10°.

FIG. 5(2) shows a movement of the tool viewed from the work coordinate system in the N4 block. The tool posture is changed in the state where the position of the tool tip point is held in substantially the same position as that of the N3 block. A symbol L is a length parallel to the tool axial direction vector from the tool tip point to the tool side rotation driving shaft center.

FIG. 5(3) shows the movement of the tool and the work viewed from the mechanical coordinate system (the XY plane) in the N4 block. A symbol R is a distance to the work original point and the table rotation driving shaft center. As the C axis is rotated by 10°, the work is rotated by 10°, and the tool is subjected to the posture change from the state tilted by 5° to the state of 0°. As the work is rotated, the tool tip point position is moved along a circular arc shape of a radius R so as to substantially hold the original point position of the work coordinate system fixed to the work. As the C axis is rotated, the tool tip point is mainly moved in the Xm axis direction by about $R*10*\pi/180$ (C is minute and is similar to sin C≈C).

FIG. 5(4) shows the movement of the tool and the work viewed from the mechanical coordinate system (the XZ plane) in the N4 block. While the tool tip point is moved like FIG. 5(3), as the tool is simultaneously rotated around the B axis by 5°, the tool side rotation driving axis center position (a pivot point) is mainly moved with respect to the tool tip point in the −Xm axis direction by about $L*5*\pi/180$ (similar to sin B≈B). When satisfying L/R=C axis rotation angle/B axis rotation angle=2, the movement of both is denied, and consequently, the tool side rotation driving shaft center position (the pivot point) viewed from the mechanical coordinate system, that is, the movement of each translation driving shaft is substantially 0. That is, the translation speed of the tool tip point viewed from the work and the speed of each translation driving shaft of the machine are also 0 or substantially 0. However, when viewed from the static mechanical coordinate system, the tool tip point is actually moving.

Figure 4:
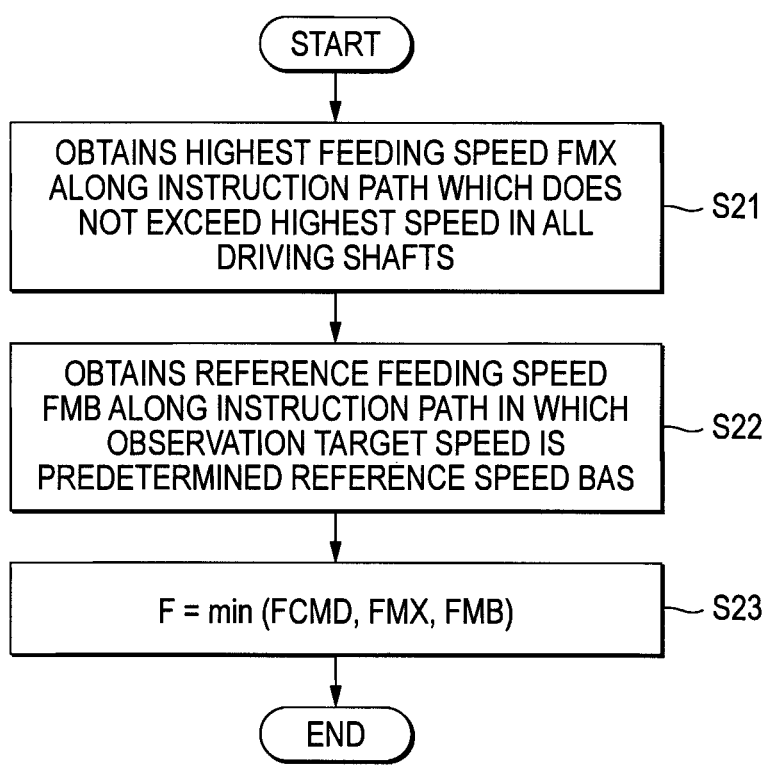
FIG. 4 is a flowchart that shows a flow of the processing which obtains a feeding speed in the numerical controller according to the embodiment 1 of the present invention.

In this case, according to the flowchart described in FIG. 4, firstly, the instruction feeding speed FCMD becomes 1000 from the processing program. In regard to the highest feeding speed FMX, since the movement of the X, Y and Z axes is substantially 0, the B axis and the C axis are substantially affected. When the highest speed of the B axis is 10,000 and the highest speed of the C axis is 15,000, FMX=MIN (10,000*0.5/5, 15,000*0.5/10)=750. If the present invention is not applied, the smaller of FCMD and FMX, that is, the movement is performed at the speed of 750. However, in that case, the time taken for the movement of the N4 block having the amount of translation movement of 0.5 is 0.5/750. When the tool tip point viewed from the mechanical coordinate system in this short time is moved by about R*10*π/180, and, for example, R is 50 and L=100, the translation speed of the tool tip point viewed from the mechanical coordinate system is 50*10*π/180 (0.5/750)≈13,090, is operated at a speed greatly exceeding the instruction feeding speed FMCD, and is dangerous.

Meanwhile, when applying the present invention, for example, when setting the reference feeding speed BAS=3,000, FMB=3,000 (50*10*π/180/0.5)≈172 so that the translation speed of the tool tip point viewed from the mechanical coordinate system does not exceed 3,000, and when F=min (1000, 750, 172)=172, by performing control to the feeding speed smaller than the highest feeding speed FMX not exceeding the instruction feeding speed FCMD and the speed of each driving shaft, the speed can be controlled so that the translation speed of the tool tip point viewed from the mechanical coordinate system does not exceed the designated reference speed.

In the present embodiment, focusing on the translation speed of the tool tip point viewed from the mechanical coordinate system stopped (or fixed to a floor of a factory) in a space, the speed is set to the observation target speed, and control was performed so that the observation target speed does not exceed the reference speed. The translation speed of the tool tip point viewed from the mechanical coordinate system is a speed at which the tool tip is moved when viewed from a worker, or by limiting the speed to be equal to or less than the reference value so as not to be rapidly moved, the risk of the interference to a worker can be lowered. Furthermore, in order to prevent collision of the tool with a member (for example, a sensor group) fixed to the base of the machine, a cover or the like or a movable portion (for example, a peripheral shaft or a shaft of another system not used in the processing) which is stopped in the currently performed processing, and damage to the tool due to collision, it is effective to limit the translation speed of the tool tip point viewed from the mechanical coordinate system so as not to be rapidly moved.

In addition, in the description mentioned above, the observation speed and the reference speed are also set to the translation speed of the reference point. However, both of them may be the synthetic speeds and common to the entire shaft, or the speeds may be set and compared for each shaft. Furthermore, practically, it is also effective to apply the present invention only in the rapid-feeding movement which is a high speed movement, during manual feeding mode having high risk to a human, and during single lock driving mode so as not to unnecessarily extend the processing time.

Furthermore, if the reference speed is automatically calculated from the instruction feeding speed and the preceding and succeeding movement, the effort of the setting can be reduced, the processing time is not excessively extended, and thus is effective. As the reference speed, by using the instruction feeding speed or multiplying the speed by a value equal to or greater than 1 (for example, set to 1.5 times of the instruction feeding speed), or adding a positive integral thereto, the speed is automatically set in connection with the instruction speed. When the movement of the rotation driving shaft is not performed, that is, only the movement of the orthogonal three axes is performed, the instruction feeding speed coincides with the synthetic speed in the mechanical coordinate system. It is easy to understand that the speed is limited to the speed extent or the extent slightly greater than the speed when viewed from an operator. According to the present specification, a specification is provided which is allowed up to the speed slightly higher than the instruction feeding speed when viewed from an operator, a high speed control is possible in the high speed processing and a careful speed control is possible in the low speed processing while avoiding the high speed movement so as not greatly exceed the instruction feeding speed, and a suitable speed limitation is possible without excessively extending the processing time depending on the processing.

Otherwise, the reference speed may be obtained by multiplying the observation target by the integral equal to or greater than 1 or adding the positive integral thereto, by the use of the observation target speed of the case of being operated in the preceding or the succeeding (when also considering the succeeding, rapid deceleration can be avoided) movement. In this case, the rapid speed change between the movement blocks can be avoided, and meanwhile, it is allowed that the speed be gradually changed between the movement blocks (whereby the continuous smooth speed is obtained). In general, in a case where the rapid change of the speed is dangerous and even if the speed itself is high, the speed is gradually changed, an operator is also able to estimate the movement of the machine to a certain extent, and the risk is low. By defining the reference speed using the observation target speed of the preceding or succeeding movement, only the rapid speed change can be suppressed, and unnecessary extension of the processing time can be avoided.

Embodiment 2

In a machine tool including the rotation driving shaft of the tool side, when the amount of translation movement of the tool tip point is changed small and the tool posture is changed greatly, the risk is high like in the embodiment mentioned above. In embodiment 1, by limiting the speed to be equal to or less than the reference speed focusing on the translation speed of the tool tip point viewed from the mechanical coordinate system, particularly, when the translation speed of the tool tip point viewed from the work and the speed of each translation driving shaft of the machine are not high, rapid movement of the machine can be avoided.

Meanwhile, although the speed of each translation driving shaft of the machine is high to a certain extent and, the feeding speed is controlled so as to be equal to or less than the highest speed of each driving shaft by the related art, in some cases, it is still insufficient. That is, since each driving shaft is equal to or less than the highest speed in the related art, respectively, when each driving shaft is concurrently operated, for example, when 3 axes of X, Y and Z are concurrently moved, if the highest speed of each axis of X, Y and Z is identical, the synthetic speed is a √3 time at the most, which is considerably dangerous speed. Furthermore, in the related art, control is generally performed which automatically lowers the feeding speed in the inner portion of the numerical controller so that the speed for each shaft does not exceed the maximum allowed speed (generally, referred to as a rapid-feeding speed or a cutting clamp speed) of each driving shaft. However, in this method, each driving shaft of the machine is driven up to considerably high speeds such as the rapid-feeding speed or the cutting clamp speed, whereby there is also a problem in that the speed is considerably increased compared to the instructed feeding speed.

Therefore, an embodiment of the present invention for coping with the problem mentioned above will be described. A configuration, a machine structure becoming a target, and an operation of the numerical controller according to embodiment 2 of the present invention are basically the same as those of FIGS. 1 to 4 mentioned in embodiment 1. Thus, the descriptions of the same portions are omitted, and different portions will be described below.

Firstly, the mechanical structure becoming the target to the numerical controller according to embodiment 2 includes a translation driving shaft of one axis or more which performs the relative translation movement of the tool relative to the work, and a rotation driving shaft of one axis or more including a tool side rotation driving shaft which rotates and drives the tool. The mechanical structure is a multi-axes machine tool which is able to control the relative translation position of the tool relative to the work and the tool posture. Typically, the mechanical structure is a tool tilt type including the 2 rotation axes at the tool side or a mixed type including one axis at each of the tool side and the work side. FIG. 2 will be described using the mechanical configuration later.

In the mechanical structure, in the embodiment 2, the reference point is set on the movable portion to be driven by the tool side rotation driving shaft. Specifically, as a location moved greatly when the tool posture is greatly changed, for example, when the rotation center (pivot point of FIG. 6) of the tool side rotation driving shaft or the main shaft head as the location easily interfered with is projected to the opposite side of the tool side behind the rotation center point of the tool side rotation driving shaft, the end portion (a $\Delta$ portion of FIG. 6) of the projected movable portion may be used.

The calculation processing in step S22 in FIG. 4 partly differs. In step S22, the reference feeding speed FMB along the instruction path is obtained in which the observation target speed FCHK is a predetermined reference speed BAS. The reference point pc is set to the main shaft head end portion ($\Delta$ of FIG. 6) viewed from the mechanical coordinate system 100, and the observation target speed FCHK is set to the translation speed of the reference point pc. When the distance from the tool side rotation driving shaft center position (the pivot point) to the reference point pc is set to L2, the relationship below is established.

$$pc = \Gamma(Pm,\theta) = (Xm + L2\sin B, \text{const.}, Zm + L2\cos B) \quad \text{(formula 6)}$$

A symbol $\Gamma$ is a function that indicates the translation position of the reference point viewed from the mechanical coordinate system relative to the position of each driving shaft. In this case, the X axis, the Z axis and the B axis moving the tool are related, but the Y axis and the C axis of the work side are not related. When the tool tip point is moved along the instruction path at the feeding speed F, firstly, the positions Pw' and Qw' on the work coordinate system of the case of being moved from the current position along the instruction path at the unit speed are obtained in the same manner as the interpolation processing of <step S3>. Next, the position Pm' of the translation driving shaft after movement and the position $\theta'$ of each rotation driving shaft are obtained by the use of the relational expression ($\phi^{-1}$, $\psi^{-1}$) of the coordinate conversion. The position pc' after movement of the reference point is obtained by the use of Pm', $\theta'$ and the function $\Gamma$. A value, which divides the absolute value (the distance) of the difference between the position pc' of the reference point after movement and the position pc of the current reference point by the control cycle with the reference speed BAS, is the reference feeding speed FMB.

Figure 6:
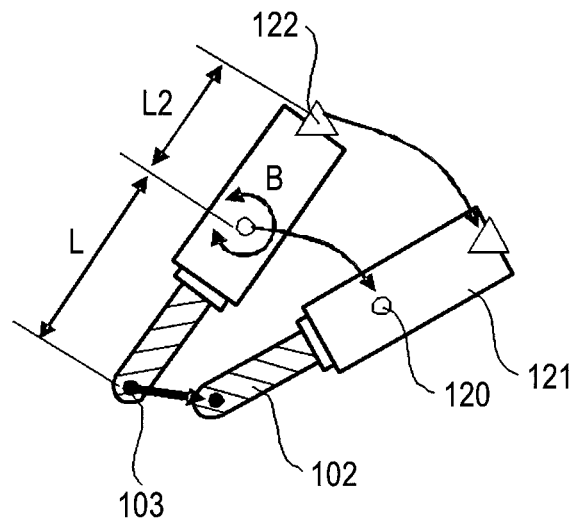
FIG. 6 is a diagram that shows a movement of a machine in embodiment 2 of the present invention.

FIG. 6 is an example of the operation according to the embodiment 2 of the present invention, the amount of translation movement of the tool tip point is relatively small, and meanwhile the change of the tool side rotation driving shaft (the B axis) is great. Particularly, in this case, the main shaft head is great, is greatly projected from the tool side rotation driving center position to the opposite side of the tool, whereby a configuration is provided in which the end portion thereof does not interfere. In this example, the reference point 122 is set in the end portion of the opposite side of the tool of the main shaft head, and by limiting the translation speed viewed from the mechanical coordinate system, the interference between the position of the reference point and an operator or another structure portion (for example, a back main shaft or the like) is suppressed.

In the embodiment 2 of the present invention, the synthetic translation speed of the reference point on the movable portion to be driven by the tool side rotation driving shaft viewed from the mechanical coordinate system stopped in the space (or fixed to a floor of a factory) is set to the observation target speed, and control is performed so that the observation target speed does not exceed a predetermined reference speed. Particularly, in the movement in which the tool posture is greatly changed, when the synthetic speed of the shaft (X and Z in this example) performing the translation driving of the tool side rotation driving time can be limited, by limiting the speed of the point (particularly, a part of the opposite side of the tool with respect to the rotation center axis, typically a point farthest from the rotation center axis, that is, a point farthest from the tool tip point or the like) which is easily interfered with on the movable portion to be driven by the tool side rotation driving shaft, contact with a person and mechanical interference are easily generated, and control can be more safely performed. Furthermore, as described in the embodiment 1, by automatically calculating the reference speed from the instruction feeding speed and the preceding and succeeding movements, it is possible to avoid unnecessary extension of the processing time without causing the rapid speed change during processing.

Embodiment 3

In the embodiments 1 and 2 mentioned above, a method has been described in which the tool tip point or a point on the movable portion driven by the rotation driving shaft of the tool side is set to the reference point, and by controlling the translation speed viewed from the mechanical coordinate system, the risk of interference or the like is suppressed.

Meanwhile, the parts that are driven by the tool or the tool side rotation driving shaft are not the only parts where interference is generated. In the machine including the work side rotation driving shaft, there is a risk of interference between the table, a jig and a work placed on the table, and a man and another part of the machine. This problem is more noticeable in the case of the machine including the rotation table. Therefore, the invention for coping with the problem will be described in the present embodiment.

A configuration, a machine structure becoming a target, and an operation of the numerical controller according to embodiment 3 of the present invention are basically the same as those of FIGS. 1 to 4 mentioned in the embodiment 1. Thus, the descriptions of the same portions are omitted, and different portions will be described below.

Firstly, the mechanical structure that is the target of the numerical controller according to embodiment 2 includes a translation driving shaft of one axis or more which performs the relative translation movement of the tool relative to the work, and a rotation driving shaft of one axis or more including a work side rotation driving shaft which rotates and drives the table with the work placed thereon. The mechanical structure is a multi-axes machine tool which is able of controlling the relative translation position of the tool relative to the work and the tool posture. Typically, the mechanical structure is a tool tilt type including the rotation 2 axes at the work side or a mixed type including each one axis in each of the tool side and the work side, respectively. FIG. 2 will be described later using the mechanical configuration.

In the mechanical structure, in the embodiment 3, the reference point is set on the movable portion to be driven by the work side rotation driving shaft, a jig or the work. Specifically, as a location moved greatly by the rotation of the work side rotation driving shaft, a position (typically, a position of Δ of FIG. 7 on the outer periphery of the circular table) farthest from the table rotation driving shaft of an upper surface of the table, a position of the work as the portion easily interfered (for example, as a representative position thereof, the work original point), a position of a specific angle of the jig placed on the table or the like are used.

The calculation processing in step S22 in FIG. 4 partly differs. In step S22, the reference feeding speed FMB along the instruction path is obtained in which the observation target speed FCHK is a predetermined reference speed BAS. The reference point pc is set to the main shaft head end portion (Δ of FIG. 6) viewed from the mechanical coordinate system 100, and the observation target speed FCHK is set to the translation speed of the reference point pc. If the position of the reference point pc is (R, 0, 0) when the C axis is 0° with respect to the table side rotation driving shaft center position, and the R is a distance from the table side rotation driving shaft center position to the reference point, the relationship below is established.

$$pc=\Gamma(Pm,\theta)=(R \cos C, -R \sin C+Ym, \text{const.}) \quad \text{(formula 7)}$$

A symbol Γ is a function that indicates the translation position of the reference point viewed from the mechanical coordinate system relative to the position of each driving shaft. In this case, the Y axis and the C axis moving the table are related, but the X axis, the Z axis and the B axis of the tool side are not related. When the tool tip point is moved along the instruction path at the feeding speed F, firstly, the positions Pw' and Qw' on the work coordinate system of the case of being moved from the current position along the instruction path at the unit speed are obtained in the same manner as the interpolation processing of <step S3>. Next, the position Pm' of the translation driving shaft after movement and the position θ' of each rotation driving shaft are obtained by the use of the relational expression ($\phi^{-1}$, $\psi^{-1}$) of the coordinate conversion. The position pc' after movement of the reference point is obtained by the use of Pm', θ' and the function Γ. A value, which divides the reference speed BAS by the division of the absolute value (the distance) of the difference between the position pc' of the reference point after movement and the position pc of the current reference point by the control cycle, is the reference feeding speed FMB.

Figure 7:
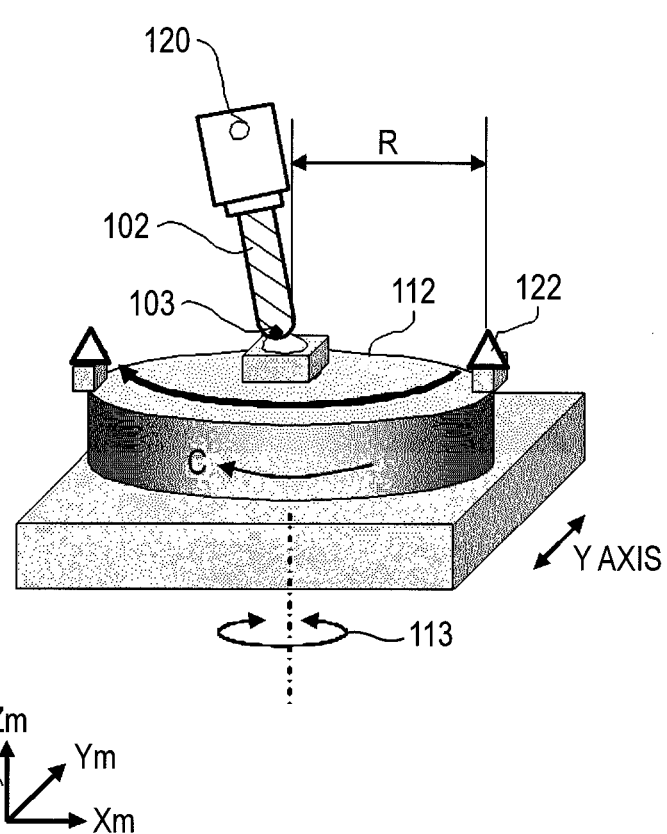
FIG. 7 is a diagram that shows a movement of a machine in embodiment 3 of the present invention.

FIG. 7 is an example of embodiment 3 of the present invention, and is a case where the C axis is instructed so as to be rotated substantially 180° while the angle of the B axis is held. Since the work is placed near the table center, the movement of the work tool translation shaft becomes larger, and the since the tilt angle of the B axis is also small, the movement of each translation driving shaft of the machine also becomes smaller. Meanwhile, the table is larger than the work, and the translation speed of the table end portion is increased. In this example, the reference point is set on the jig attached to the table end portion or the angle reference member, and by limiting the translation speed viewed from the mechanical coordinate system, the interference between the position of the reference point and another structure portion is suppressed.

In the embodiment 3 of the present invention, the synthetic translation speed of the reference point is set to the observation target speed, on the movable portion to be driven by the work side rotation driving shaft viewed from the mechanical coordinate system stopped in the space (or fixed to a floor of a factory), the jig or the work, and control is performed so that the observation target speed does not exceed a predetermined reference speed. As a result, control can be more safely performed without generating the interference of the table, the jig, or the work with a person or another member. Furthermore, as described in the embodiment 1, by automatically calculating the reference speed from the instruction feeding speed and the preceding and succeeding movements, it is possible to avoid unnecessary extension of the processing time without causing the rapid speed change during processing.

Embodiment 4

In the embodiments 1 to 3 mentioned above, a case (the tool tip point control) has been described where the feeding speed of the tool tip point relative to the work is instructed to the processing program. Meanwhile, in the case of not using the tool tip point control, a movement amount of each driving shaft as the instruction path or the movement speed (the synthetic speed of the entire driving shafts) as the instruction feeding speed is directly instructed to the processing program. At this time, in some cases, the amount of translation movement of the tool relative to the work is 0 or small depending on the instruction path and the instruction feeding speed instructed to the processing program. In that case, the feeding speed of the tool relative to the work is 0 or a low speed, and there was a problem in that the processing time is unnecessarily extended. Therefore, the numerical controller according to embodiment 4 promotes the solution of the problem.

The configuration, the mechanical structure becoming the target, and the operation of the numerical controller according to the embodiment 4 of the present invention are basically the same as those of FIGS. 1 to 4 mentioned in the embodiment 1, and thus, the descriptions of the same portion are omitted, and the different portions will be described below.

In the numerical controller according to the embodiment 4 of the present invention, since the movement amount of each driving shaft and the speed are directly instructed, the coordinate conversion portion 22 shown in FIG. 1 (the order of step S4 shown in FIG. 3) may be omitted. However, when the position and the position of the work estimated in the processing program 2, or the position and the posture of the processing surface are different from the position and the posture of the work actually placed on the machine tool, or the position and the posture of the processed processing surface, the coordinate conversion corresponding to the difference amount (an amount of the work placement error or an amount of the position of the processing surface and the offset of the posture) between the position and the posture of both, and the coordinate is converted from the position and the posture (each driving shaft position not considering the amount of the work placement error or the offset amount) of the tool instructed to the processing program to each actual driving shaft position.

Furthermore, the mechanical structure becoming the target may be a multi-axes machine tool which is able to control the relative position and posture of the tool relative to the work, by the translation driving shaft performing the translation movement of the tool relative to the work and the rotation driving shaft rotating and moving the table with the work placed thereon, that is, typically, the five-axis processing machine, and may be any one of a table tilt type, a mixed type, and a tool tilt type.

Meanwhile, in the embodiment 4 of the present embodiment, the reference point is set to the tool tip point, and the translation speed of the tool tip point relative to the work is set to the observation target speed. At this time, the calculation processing in step S22 in FIG. 4 partially differs. In step S22, the reference feeding speed FMB along the instruction path is obtained in which the observation target speed FCHK is a predetermined reference speed BAS. The reference point pc is set to the tool tip point (Δ of FIG. 8) viewed from the work coordinate system 100, and the observation target speed FCHK is set to the translation speed viewed from the work coordinate system of the reference point pc. The coordinate conversion from the position of each driving shaft to the translation position of the tool tip point viewed from the work coordinate system is given in formula 1. When the tool tip point is moved along the instruction path at the feeding speed F, firstly, the positions Pm' and θ' of each driving shaft in the case of being moved from the current position along the instruction path at the unit speed are obtained in the same manner as the interpolation processing of <step S3>. Next, the position Pc' after movement of the reference point viewed from the work coordinate system is obtained by the use of the relational expression (φ) of the coordinate conversion of formula 1. A value, which divides the reference speed BAS by the division of the absolute value (the distance) of the difference between the position pc' of the reference point after movement and the position pc of the current reference point by the control cycle, is the reference feeding speed FMB. Furthermore, the FCMD is not used in step S23, and the smaller side of the FMB and the FMX is set to the feeding speed.

$$F=\min(FMX,FMB) \quad \text{(formula 8)}$$

Figure 8:
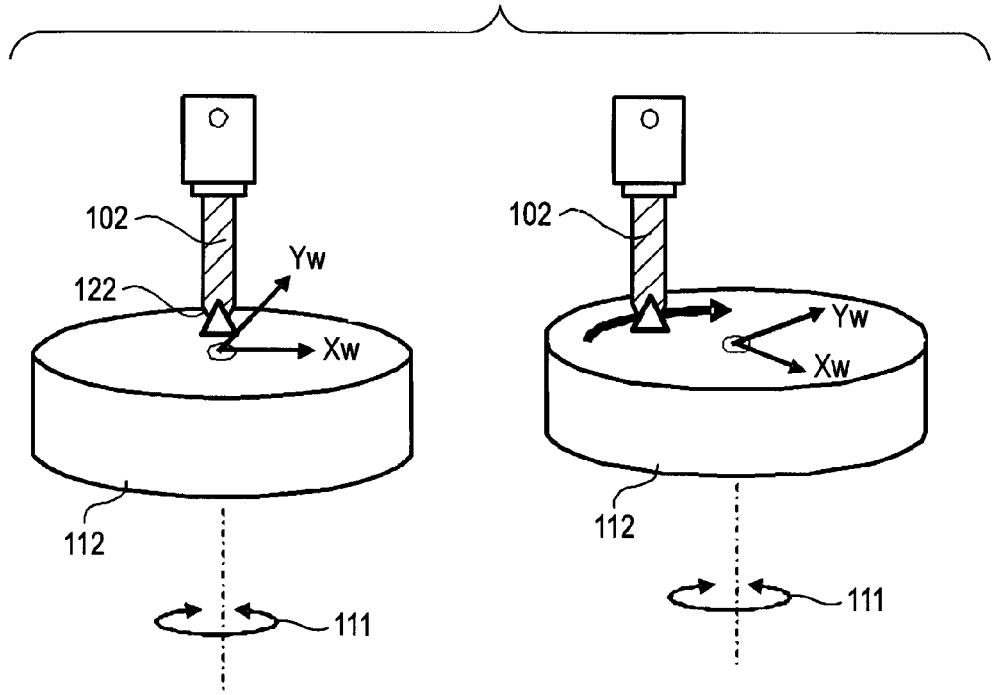
FIG. 8 is a diagram that shows a movement of a machine in embodiment 4 of the present invention.

FIG. 8 is a diagram that shows the movement of the machine in the embodiment 4 of the present invention. FIG. 8(1) is a case where the tool tip center is on the center axis of the table rotation driving shaft in a peculiar posture (a state where the tool posture vector is parallel to the table rotation center axis), and the movement of only the C axis is instructed in that position. That is, in this case, by the movement of the table side rotation driving shaft (the C axis), the position of the tool tip center point (the reference point, Δ of FIG. 8) viewed from the work coordinate system is not changed. In this case, no matter how high the feeding speed FCMD (the rotation speed of the C axis in this example) of the entire shaft combination is, the translation speed of the tool tip point viewed from the work coordinate system is 0. In this case, the FMB is infinite, and F=FMX may be obtained in equation 8.

FIG. 8(2) is a case where the C axis movement and the circular arc movement of X axis and Y axis are concurrently instructed in the peculiar posture, and the position of the tool tip point is regular when viewed from the work. Similarly, in this case, no matter how high the feeding speed FCMD (the rotation speed of the C axis in this example) of the entire axis combination is, the translation speed of the tool tip point viewed from the work coordinate system is also 0. In this case, the FMB is infinite, and F=FMX may be obtained in equation 8. In this manner, in the movement which includes the table side rotation driving shaft in the peculiar posture, there is a case where the relative speed of the tool tip point viewed from the work is 0. Furthermore, in the case of being closer to the peculiar posture, in the movement which includes the table side rotation driving shaft, there is a case where the relative speed of the tool tip point viewed from the work is a small value. In such a case, the tool is moved at a speed higher than the instruction feeding speed so as to increase the relative speed of the tool tip point viewed from the work.

Herein, the peculiar posture (the peculiar point) generally refers to a state where a function of a degree of freedom of a specific direction is lost, and in the case of the machine tool including the rotation shaft, the peculiar posture refers to a position (an angle) in which even when any rotation driving shaft is moved, the tool posture relative to the work is not changed.

As mentioned above, in the case of performing the coordinate conversion for the correction of the placement error or the like, in the example of FIG. 8, even when the movement of the C axis is instructed and the C axis is interpolated at the instruction speed, the position of the tool tip point viewed from the work coordinate system and the tool posture torque are not changed. Thus, each driving shaft position after the coordinate conversion is not also changed (that is, the machine is not moved). That is, the machine is not moved, but the time for the movement is taken. In such a case, by performing the interpolation at the speed higher than the instruction speed using the method mentioned above, the movement time is reduced.

According to the embodiment 2 of the present invention, in the machine tool (typically, the 5-axes processing machine) which includes the translation driving shaft and the rotation driving shaft, by correcting the instruction feeding speed so that the translation speed of the tool tip point relative to the work becomes a predetermined reference speed, the translation speed of the tool tip point relative to the work is maintained at a constant speed, whereby it is possible to avoid the feeding speed being unnecessarily lowered.

Particularly, in the instruction path instructed in the processing program, when the tool posture relative to the work is a peculiar posture and there is no translation movement of the tool tip point relative to the work, the instruction path proceeds to the next instruction path so as to be moved at the movement time 0 (the movement is not performed, the movement instruction is not executed, and the instruction path immediately proceeds to the next movement instruction) or the minimum control cycle (a value, which divides the entire axis synthetic distance of the instruction path by the control cycle, is set to the feeding speed). Otherwise, by changing the feeding speed, the interpolation is realized so that the movement time is not unnecessarily extended, whereby the processing time can be reduced.

In addition, the embodiments 1 to 4 mentioned above describe the example of the case of being automatically operated along the processing program. However, the present invention can be similarly applied to the case of manually instructing the instruction feeding speed, for example, by a press button and a handle. In this case, there is an effect that problems such as interference in the working caused by manual operation hardly occur.

INDUSTRIAL APPLICABILITY

The numerical controller according to the present invention is used for suppressing the risk such as the mechanical collision and the contact with an operator when controlling the multi-axes machine tool capable of controlling the relative position and the posture of the tool relative to the work provided with the rotation driving shaft.

EXPLANATION OF REFERENCE 1 numerical controller
2 processing program
3 instruction path
4 instruction feeding speed
10 feeding speed determination portion
11 highest speed of each driving shaft
12 reference speed
13 feeding speed
20 interpolation portion
21 interpolation position
22 coordinate conversion portion
23 driving shaft position
100 mechanical coordinate system
101 tool side rotation driving shaft
102 tool
103 tool tip point
104 tool axial direction vector
110 work
111 work coordinate system
112 table
113 work side rotation driving shaft
120 tool side rotation driving shaft center position (pivot point)
121 main shaft head
122 reference point

The invention claimed is:

1. A numerical controller that controls a relative position and a tool posture of a tool relative to a work of a multi-axes machine tool, which includes a translation movement shaft performing a translation movement of the tool relative to the work, and a rotation driving shaft rotating and moving a table with the work placed thereon, based on an instruction path of each driving shaft and an instruction feeding speed of an entire driving shaft combination, the numerical controller comprising:

a feeding speed determination portion which outputs a feeding speed; and an interpolation portion which obtains an interpolation position of each driving shaft for each control cycle that is moved along the instruction path at the feeding speed, wherein, when an amount of translation movement of the tool relative to the work is 0 or relatively small, the feeding speed determination portion obtains a maximum allowed feeding speed along the instruction path, without outputting the instruction feeding speed to be instructed by a processing program to the interpolation portion, obtains a reference feeding speed of the entire driving shaft combination so that a translation speed of the tool tip point relative to the work is set to an observation target speed, and among the obtained maximum allowed feeding speed and the obtained reference feeding speed, outputs a smaller feeding speed to the interpolation portion.

2. The numerical controller according to claim 1, wherein the interpolation portion performs the interpolation so that the instruction path is moved in a movement time 0 or a minimum control cycle, when the tool posture relative to the work is a peculiar posture in the instruction path instructed to the processing program, and there is no translation movement of the tool tip point relative to the work.

* * * * *